United States Patent [19]

Tsutsumi et al.

[11] Patent Number: 5,011,888

[45] Date of Patent: Apr. 30, 1991

[54] VULCANIZED RUBBER COMPOSITION

[75] Inventors: Fumio Tsutsumi, Yokkaichi; Akihiko Morikawa, Tsu; Mitsuhiko Sakakibara, Yokkaichi; Noboru Oshima, Suzuka; Tatsuro Hamada; Tatsuo Fujimaki, both of Higashimurayama; Masayuki Ohashi, Suginami, all of Japan

[73] Assignees: Japan Synthetic Rubber Co.; Bridgestone Corp., both of Tokyo, Japan

[21] Appl. No.: 449,308

[22] Filed: Dec. 6, 1989

Related U.S. Application Data

[63] Continuation of Ser. No. 291,320, Dec. 28, 1988, abandoned, which is a continuation of Ser. No. 925,048, Oct. 30, 1986, abandoned.

[30] Foreign Application Priority Data

Oct. 30, 1985 [JP] Japan .................. 60-243640

[51] Int. Cl.$^5$ .................. C08L 9/06; C08L 53/02
[52] U.S. Cl. .................. 525/98; 525/123; 525/236; 525/237; 525/314; 525/332.5; 525/332.9; 525/374; 526/340
[58] Field of Search .................. 525/314, 332.9, 374, 525/123, 98, 99, 125, 332.5, 332.6, 236, 237; 526/340

[56] References Cited

U.S. PATENT DOCUMENTS

| | | | |
|---|---|---|---|
| 3,281,383 | 10/1966 | Zelinski et al. | 525/122 |
| 3,838,108 | 9/1974 | Hergenrother | 260/77.5 CR |
| 3,985,830 | 10/1976 | Fetters | 525/314 |
| 4,070,344 | 1/1978 | Hergenrother | 525/374 |
| 4,433,109 | 2/1984 | Takeuchi | 525/314 |
| 4,463,133 | 7/1984 | Takeuchi | 525/99 |
| 4,540,744 | 9/1985 | Oshima | 525/332.9 |
| 4,575,534 | 3/1986 | Oshima | 525/99 |

FOREIGN PATENT DOCUMENTS 0054440 6/1982 European Pat. Off. .

*Primary Examiner*—Fred Teskin
*Attorney, Agent, or Firm*—Sughrue, Mion, Zinn Macpeak & Seas

[57] ABSTRACT

A rubber composition is disclosed which contains not less than 20% by weight in a rubber component of a block copolymer composed of polymer or copolymer block units (A) and a random copolymer block units (B). The polymer or copolymer block units (A) are obtained by singly polymerizing a conjugated diolefine or copolymerizing the conjugated diolefine and a monovinyl aromatic hydrocarbon with use of a lithium initiator and contains not more than 10% by weight of the bound monovinyl aromatic hydrocarbon. The random copolymer block unit (B) are obtained by copolymerizing the conjugated diolefine and the monovinyl aromatic hydrocarbon and contain 15 to 80% by weight of the bound monovinyl aromatic hydrocarbon. In the block copolymer, (i) the block copolymer contains not less than 10% by weight of each of the block units (A) and the block units (B); (ii) the total content of the bound monovinyl aromatic hydrocarbon is from 10 to 40% by weight; (iii) the average content of the vinyl bonds in the conjugated diolefine portions is from 20 to 70%; and (iv) polymerizable terminals of the block copolymer are reacted with an isocyanate compound.

3 Claims, No Drawings

VULCANIZED RUBBER COMPOSITION

This is a continuation of application Ser. No. 07/291,320 filed Dec. 28, 1988, now abandoned which is a continuation of application Ser. No. 06/925,048 filed Oct. 30, 1986, now abandoned.

BACKGROUND OF THE INVENTION

1. Field of the Invention

The present invention relates to a rubber composition composed of a block copolymer comprising two different polymer block units and having polymer terminals modified with an isocyanate compound, said rubber composition using a conjugated diolefine and a monovinyl aromatic hydrocarbon as starting materials.

2. Related Art statement

Recently, in order to improve fuel mileage and running safety of automobiles, materials having a smaller rolling friction resistance, a larger wet skid resistance and a larger ice skid resistance have been desired as rubbers for use in tire treads of the automobiles.

However, the above resistances are contradictory to one another. Further, when these resistances as well as the wearing property cannot be simultaneously satisfied by a single rubber. Under the circumstances, blended compositions of different kinds of rubbers have been used to harmonize the above properties. For instance, there has been used, as a rubber for the tire treads of the automobiles, a blended composition consisting of a styrene-butadiene copolymer rubber having a relatively large wet skid resistance and containing 10 to 30% by weight of a bound styrene and not more than 20% by weight of vinyl bounds and a polybutadiene rubber having a small rolling friction resistance and a good wear resistance and containing not more than 20% of vinyl bonds. However, such a blended composition does not reach a satisfied level particularly with respect to the wet skid resistance.

In recent years, SBR (styrene-butadiene rubber) and BR (butadiene rubber) obtained by mainly using an organic lithium initiator has been attempted to be modified so as to improve the wet skid resistance and the rolling friction resistance. In this connection, a rubber composition containing BR with much vinyl bonds has been lately proposed as a rubber composition meeting the above object (see British patent No. 1166832). Although the BR containing much vinyl bonds is excellent in balance between the wet skid resistance and the rolling friction resistance, it is extremely poor in the fracture property and the wearing property. Therefore, it is difficult to singly use such a BR as a rubber. Thus, in order to improve the fracture property and the wearing property, a blended composition of BR and a diene rubber such as NR (natural rubber), high cis-BR or an emulsion polymerized SBR has been proposed. However, the blended composition of NR or high cis-BR and BR has the shortcoming that it is inferior in the balance among the wet skid resistance, fracture property and the wearing property. On the other hand, the blended composition of BR and SBR is unfavorably inferior in the rolling friction resistance.

Further, according to Japanese patent application Laid-open No. 54-62,248, the wet skid resistance and the rolling friction resistance are attempted to be improved by using random SBR containing 20 to 40% by weight of bound styrene and having a relatively high amount of vinyl bonds. As compared with the conventional emulsion polymerized SBR and SBR obtained by using an organic lithium initiator, balance among the wet skid resistance, the rolling friction resistance and the wearing property are indeed improved, but it is still unsatisfactory for practical application. Thus, it must be used in a form blended with another diene rubber. However, as in the case of the high vinyl content BR, only insufficient balance among the wet skid resistance, rolling friction resistance, the fracture property, and the wearing property have not been obtained for a blended system with any rubber.

In view of the above situation, the present inventors have strenuously made effort to obtain a rubber material having an excellent balance among the wet skid resistance, the rolling friction resistance and the wearing property, and as disclosed in Japanese patent application Nos. 55-178,226, 55-186,194 and 55-186,195, they found that the balance among the above properties can be improved by selecting the content of bound styrene and the content of vinyl bonds of block portions in specified ranges with respect to a styrene-butadiene block copolymer composed of random copolymer blocks each having different bound styrene content and vinyl bond content. However, since social demand has increasingly become higher with respect to the safety and low fuel mileage for the tires, the tires obtained from a single use of the block copolymer or a blend of a different kinds of a rubber therewith still have a room to be improved in respect to the wearing property and the fracture property.

As disclosed in Japanese patent application No. 56-85,481, the present inventors have found after further strenuously improving effort that a rubber composition containing a block copolymer having a Mooney viscosity (ML ($100°$ C., 1+4)) of 20 to 150, composed of two kinds of specific random copolymer blocks having different contents of monovinyl aromatic hydrocarbon, and having metal (particularly preferably tin) and carbon bonds in molecular chains of a part of the polymer meets the above object.

However, since polymer terminals in the thus obtained rubber composition are carbon-tin bonds, the carbon-tin bonds at the polymer terminals are easily cut due to a chemical reaction between polymer terminals and an acidic substance such as an inorganic acid, an organic carboxylic acid and a Lewis acid, an organic phosphorus compound, or an organic sulfur compound, or hydrolysis in the presence of a strong acid or a strong alkali, the molecular weight largely varies and the rubber composition is therefore unstable. When the molecules are cut in such a way, rebound resilience and tensile strength are extremely lowered. Accordingly, the polymer has restrictions upon kinds of a polymerization terminator and an antioxidant, desolvation conditions, a kind of an oil extender to be added, a kind of other polymer to be blended, etc. in the production of the polymer.

SUMMARY OF THE INVENTION

The present inventors further made strenuous examination with respect to a rubber composition excellent in balance among the wet skid resistance, and the wearing property, the rolling friction resistance, and also excellent in rebound resilience, fracture strength, and particularly fracture strength at high temperature, and free from easy change in the molecular weight. Consequently, they have found that a rubber composition containing a block copolymer having a Mooney viscosity (ML (100° C., 1+4)) of 20 to 150, composed of two kinds of specific random copolymer blocks, and having isocyanate-modified groups in molecular chains of a part of the polymer can accomplish the object of the present invention.

It is an object of the present invention to provide a rubber composition containing not less than 20% by weight in a rubber component of a block copolymer composed of polymer or copolymer block units (A) and a random copolymer block units (B), said polymer or copolymer block units (A) being obtained by singly polymerizing a conjugated diolefine or copolymerizing the conjugated diolefine and a monovinyl aromatic hydrocarbon with use of a lithium initiator and containing not more than 10% by weight of the bound monovinyl aromatic hydrocarbon and said random copolymer block (B) being obtained by copolymerizing the conjugated diolefine and the monovinyl aromatic hydrocarbon and containing 15 to 80% by weight of the bound monovinyl aromatic hydrocarbon, wherein:

(i) the block copolymer contains not less than 10% by weight of each of the block units (A) and the block units (B);

(ii) the total content of the bound monovinyl aromatic hydrocarbon is from 10 to 40% by weight;

(iii) the average content of the vinyl bonds in the conjugated diolefine portions is from 20 to 70%; and (iv) polymerizable terminals of the block copolymer are reacted with an isocyanate compound.

According to a preferred embodiment of the present invention, there is a provision of the rubber composition, wherein the average content of the vinyl bonds in the conjugated diolefine portions of the polymer or copolymer block units (A) is from 10 to 60%, the average content of the vinyl bonds of the conjugated diolefine portions of the copolymer block units (B) is from 25 to 90%, and the average content of the vinyl bonds of the copolymer block units (B) is larger by not less than 5% than that of the polymer or copolymer block units (A).

These and other objects, features and advantages of the invention will be well appreciated upon reading of the following description of the invention with understanding that some modifications, variations and changes could be done by the skilled person in the art to which the invention pertains without departing from the spirit of the invention or the scope of claims appended hereto.

DETAILED DESCRIPTION OF THE INVENTION

Various excellent properties of the rubber composition according to the present invention are obtained by that the polymer or copolymer block units (A) and the copolymer block units (B) having different monomer compositions and different glass transition temperatures are blocked during a polymerization step and further the rubber composition contains the block copolymer having isocyanate-modified groups in a part of the molecular chains.

The excellent balance between wet skid property and rolling friction resistance as in the present invention can not be obtained merely by blending the random polymer or copolymer block units (A) or the random copolymer block units (B) and another rubber. Further, the rubber composition including the block copolymer obtained according to the present invention is more excellent in fracture property and wearing property as compared with the rubber composition of the block copolymer having no isocyanate-modified groups in the molecular chains.

According to the present invention, the block copolymer is converted to a rubber composition by blending it with one or more kinds of other rubbers selected from natural rubber, cis-polyisoprene rubber, polybutadiene rubber, and styrene-butadiene copolymer rubber, ethylene-propylene-diene terpolymer rubber, and butyl rubber.

In the rubber composition according to the present invention, the content of the block copolymer needs to be at least 20% by weight, preferably 30% by weight. If it is less than 20% by weight, wet skid property can not be obtained together with excellent intended properties.

As the monovinyl aromatic hydrocarbons in the block copolymer, use may be ordinarily made of styrene, α-methylstyrene, etc. Particularly, styrene is preferred. The content of the bound monovinyl aromatic hydrocarbon is not more than 10% by weight in the case of the polymer or copolymer block units (A) and 15 to 80% by weight, preferably, 20 top 45% by weight in the case of the copolymer block units (B). The content of the total bound monovinyl aromatic hydrocarbon in the block copolymer is 10 to 40% by weight, preferably 15 to 35% by weight. If the content of the bound monovinyl aromatic hydrocarbon in the polymer or copolymer block units (A) exceeds 10% by weight, the rolling friction resistance is deteriorated. If the content of the bound monovinyl aromatic hydrocarbon in the copolymer block units (B) is less than 15% by weight, the wet skid resistance and the fracture property are poor, while if it is over 80% by weight, the rolling of friction resistance is deteriorated.

Conjugated diolefine used in the block copolymer is butadiene, isoprene, etc.

Although the bound fashion of the conjugated diolefine in the block units in the block copolymer is not particularly restricted, it is necessary that the average content of the vinyl bonds in the block copolymer is in a range of 20 to 70%, in view of the balance between the wet skid property and the rolling friction resistance.

It is necessary that each of the polymer or copolymer block units (A) and the copolymer block units (B) is contained in the block copolymer in an amount of at least 10% by weight, preferably not less than 20% by weight. If the content of the polymer or copolymer block units (A) is less than 10% by weight, the rolling friction resistance of the rubber composition is poor, while if the content of the copolymer block units (B) is less than 10% by weight, the fracture property and the wearing property are deteriorated.

The great characteristics of the rubber composition according to the present invention is that the block copolymer contains the polymer having isocyanate-modified groups in the molecular chains thereof.

The block copolymer containing the isocyanate-modified groups in the molecular chains according to the present invention is obtained by singly polymerizing conjugated diolefine or copolymerizing the conjugated diolefine and monovinyl aromatic hydrocarbon at a desired monomer compounding ratio of the block units (A) or (B) in an hydrocarbon solvent in the presence of an ether or a tertial amine with use of an organic lithium compound to thereby form the block units (A) or (B), adding a monomer of the other block units at a desired monomer compounding ratio, performing polymerization, and then adding and reacting the isocyanate compound in a specific range to the thus obtained polymer. As the isocyanate compound used in the reaction, use may be one or more of phenyl isocyanate, hexamethylene diisocyanate, 2,4-tolylene diisocyanate, 2,6-tolylene diisocyanate, diphenylmethane diisocyanate, naphthalene diisocyanate, tolidine diisocyanate, triphenylmethane triisocyanate, polymeric diphenyl methane diisocyanate, p-phenylene diisocyanate, tris(isocyanatephenyl)thiophosphate, xylylene diisocyanate, benzen-1,2,4-triisocyanate, naphthalene-1,2,5,7-tetraisocyanate, naphthalene-1,3,7-triisocyanate, various kinds of aromatic polyisocyanate, dimer or trimer of various kinds of isocyanate compounds, or adducts obtained by reacting the above isocyanates with a polyol and a polyamine.

The above isocyanate compound is used in an amount of 0.2 equivalent to 10 equivalents, preferably 0.5 to 4 equivalents, more preferably 1 equivalent to 3 equivalents in terms of isocyanate groups per one mole of lithium atom of lithium initiator used in the polymerization. If the amount is out of the range of from 0.2 to 10 equivalents, the rubber composition having excellent rebound resilience and fracture strength can not be obtained. Further, it is necessary that the isocyanate compound is reacted with active terminals, for instance, lithium terminals of the polymer. Even if the polymer and isocyanate compounds are merely mixed in a solution or solid state, the effects of the present invention cannot be obtained.

A post treatment after the coupling between the isocyanate compound and the polymerization active terminals is not particularly restricted. In this case, when free isocyanate groups are present in the terminals of the polymer, it is possible to further introduce various functional groups. For instance, a compound such as a primary or secondary amine, thiol, alcohol or carboxylic acid may be reacted with the isocyanate groups after the coupling.

The rubber composition containing the block copolymer obtained according to the present invention is not only excellent in the wet skid property and the rolling friction resistance, but also the wearing property and the fracture property, and particularly, the fracture strength at high temperatures are improved. Therefore, the rubber composition may be suitably used as rubber materials for use in tire tread side wall, carcass, and belt and various kinds of industrial articles such as hose. As compounding agent in this case, various kinds of ordinarily used compounding agents, for instance, carbon black, process oil, filler, vulcanization accelerator, and vulcanizing agent are used as they are.

Although the present invention will be explained more concretely with reference to specific Examples, the invention should never be intended to be limited thereto so long as the invention does not deviate from the abovementioned scope.

EXAMPLES 1-8 and COMPARATIVE EXAMPLES 1-9

Samples of block copolymers (Polymers A-N) shown in Table 1 were obtained according to respective polymerization recipes in Table 2. Polymerization reaction was first carried out under block (A)-polymerizing conditions by using cyclohexane and n-butyllithium as a solvent and a polymerization initiator, respectively. After the polymerization conversion reached 95 to 100%, a specific amount of an ether solution of monomers was charged, and the polymerization was effected under the Block (B)-polymerizing conditions. After the polymerization was completed, a specific amount of a coupling agent was added. In the sample of the Polymer (B), first the polymerization was carried out under the Block (B)-polymerizing conditions. After the polymerization conversion reached 95 to 100%, the polymerization was carried out under the Block (A)-polymerizing conditions. After the polymerization was completed, a specific amount of a coupling agent was added. The content of styrene and the content of the vinyl bonds were determined by an infrared spectrophotometer. Polymers A, B and F were subjected to a heat aging test at 90° C. in air atmosphere. Results are shown in Table 3.

By using Polymers A-N, samples having undergone the heat aging test, Polymers O, P and Q, compounded mixtures were prepared according to a compounding recipe in Table 4, and vulcanized. Properties of the vulcanizates obtained are shown in Table 5. A wet skid resistance measured by a skid tester, a Dunlop rebound resilience at 70° C. and a tensile strength (ordinary temperature, 100° C.) were used as an index of the wet skid resistance, an index of the rolling friction resistance, and an index of the fracture property, respectively.

Examples 1-7 are excellent in tensile strength (ordinary temperature, high temperature), Dunlop rebound resilience, wet skid property, and lambourn friction property, and therefore well balanced with respect to these properties.

Since Comparative Examples 2, 3, 6 and 7 are out of the claimed styrene content or the claimed vinyl content, there are inferior in terms of the wet skid property or the Dunlop rebound resilience.

Further, Comparative Example 10 is inferior in terms of tensile strength at high temperatures than the sample coupled with the isocyanate. In the sample in which random SBR was coupled with C-MDI (Comparative Example 7), the wet skid resistance, etc. are not still unsatisfactory. Even by simply blending two SBR having structures of the block (A) and the block (B) (Comparative Example 8), the properties of the rubber composition according to the present invention can not be obtained. Comparative Example 1 containing a small amount of the block copolymer according to the present invention and Comparative Example 9 composed of a blended system of the SBR obtained by emulsion polymerization and NR are inferior in wet skid property.

The deterioration of physical properties of the polymers (Comparative Examples 11 and 12) having undergone the coupling with C-MDI after heat aging test was not observed, but those of the polymer (Comparative Example 13) coupled with SnCl$_4$ are lowered.

TABLE 1

| Polymer | Block (A) Vinyl bonds in butadiene portion (%) | Block (A) Bound styrene content (wt %) | Block (B) Vinyl bonds in butadiene portion (%) | Block (B) Bound styrene content (wt %) | Whole polymer Vinyl bonds in butadiene portion (%) | Whole polymer Bound styrene content (wt %) | (NCO)/Li (molar ratio) | (A)/(B) (weight ratio) | $ML_{1+4}^{100°C.}$ | Coupling agent |
|---|---|---|---|---|---|---|---|---|---|---|
| A | 25 | 5 | 50 | 45 | 35 | 21 | 1.0 | 3/2 | 53 | C-MDI*2 |
| B | 40 | 0 | 55 | 35 | 50 | 24.5 | 1.0 | 3/7 | 62 | " |
| C | 12 | 5 | 62 | 35 | 40 | 25 | 1.0 | 1/2 | 60 | " |
| D | 25 | 0 | 50 | 50 | 35 | 20 | 1.0 | 3/2 | 51 | TDI*3 |
| E | 50 | 0 | 42 | 35 | 45 | 23 | 1.0 | 1/2 | 61 | C-MDI |
| F | 25 | 5 | 50 | 45 | 35 | 21 | — | 3/2 | 53 | SnCl4*1 |
| G | 50 | 5 | 50 | 60 | 50 | 42 | 1.0 | 1/2 | 55 | C-MDI |
| H | 31 | 20 | 51 | 20 | 41 | 20 | 1.0 | 1/2 | 61 | " |
| I | 25 | 5 | — | — | 25 | 5 | — | — | 54 | — |
| J | 50 | 45 | — | — | 50 | 45 | — | — | 57 | — |
| K | 75 | 0 | 70 | 20 | 72 | 13 | 1.0 | 1/2 | 55 | C-MDI |
| L | 12 | 0 | 27 | 30 | 18 | 15 | 1.0 | 1/2 | 58 | " |
| M | 25 | 5 | 50 | 45 | 35 | 21 | — | 3/2 | 52 | — |
| N | 50 | 25 | — | — | 50 | 25 | 1.0 | — | 51 | C-MDI |

Note:
*1The content of Sn—C bound chains in polymer was 51% (determined from a rate of a polymer component measured according to GPC method)
*2Polymeric diphenylmethane diisocyanate
*3Trilenediisocyanate

TABLE 2

| Polymer | n-butyl lithium (g) | Block (A)-polymerizing conditions Butadiene/styrene (g) | Block (A)-polymerizing conditions Tetrahydrofurane (g) | Block (A)-polymerizing conditions Polymerizing temperature (°C.) | Block (B)-polymerizing conditions Butadiene/styrene (g) | Block (B)-polymerizing conditions Tetrahydrofurane (g) | Block (B)-polymerizing conditions Polymerizing temperature (°C.) | Coupling agent and addition amount thereof (g) | (A)/(B) weight ratio |
|---|---|---|---|---|---|---|---|---|---|
| A | 0.35 | 285/15 | 1.0 | 50 | 110/90 | 0.95*1 | 50~80 | C-MDI 0.77 | 3/2 |
| B | 0.36 | 150/0 | 20.0 | 50–80 | 228/120 | 20.0 | 50 | " 0.79 | 3/7 |
| C | 0.36 | 159/8 | — | 50 | 216/117 | 17.5 | 40 | " 0.79 | 1/2 |
| D | 0.35 | 300/0 | 1.0 | 50 | 100/100 | 0.95*1 | 50~80 | " 0.77 | 3/2 |
| E | 0.37 | 167/0 | 4.5 | 40 | 216/117 | 4.5 | 50 | " 0.81 | 1/2 |
| F | 0.35 | 285/15 | 20.0 | 50 | 110/90 | 0.95*1 | 50~80 | SnCl4 0.26 | 3/2 |
| G | 0.41 | 159/8 | 4.5 | 40 | 133/200 | 18.0 | 50 | C-MDI 0.90 | 1/2 |
| H | 0.36 | 134/33 | 1.5 | 40 | 266/67 | 16.0 | 40~80 | " 0.79 | 1/2 |
| I | 0.32 | 475/25 | 1.0 | 50 | — | — | — | — | — |
| J | 0.30 | 275/225 | 100.0 | 50 | — | — | — | — | — |
| K | 0.33 | 167/0 | 16.0 | 30 | 266/67 | 17.5 | 40~80 | C-MDI 0.73 | 1/2 |
| L | 0.36 | 250/0 | — | 50 | 175/75 | 4.0 | 50~95 | " 0.79 | 1/2 |
| M | 0.27 | 285/15 | 1.0 | 50 | 110/90 | 0.95*1 | 50~80 | — | 3/2 |
| N | 0.24 | 375/125 | 10.0 | 50 | — | — | — | C-MDI 0.53 | — |

Solvent: cyclohexane 2,000 g
Note:
*1Ethylene glycoldibutyl ether was used as a vinyl bound amount-controlling agent instead of tetrahydrofurane.

TABLE 3

| Polymer | Results on Heat aging test*1 Original $ML_{1+4}^{100°C.}$ | $ML_{1+4}^{100°C.}$ after 5 days |
|---|---|---|
| A | 53 | 52 |
| B | 51 | 51 |
| C | 53 | 37 |

Note:
*1Carried out at 90° C. in air atmosphere

TABLE 4

| Compounding recipe | Parts by weight |
|---|---|
| Polymer | 100 |
| HAF carbon | 50 |
| Stearic acid | 2 |
| Zinc oxide | 3 |
| Antioxidant 810NA*1 | 1 |
| Vulcanization accelerator CZ*2 | 0.6 |
| M*3 | 0.6 |
| D*4 | 0.4 |
| Sulfur | 1.5 |

Note:
*1N-phenyl-N'-isopropyl-p-phenylenediamine
*2N-cyclohexyl-2-benzothiazolylsulfeneamide
*32-mercaptobenzothiazol
*41,3-diphenylgianidine

TABLE 5

| | Polymer | (parts) | NR (parts) | Cis-BR*1 (parts) | Emulsion-polymerized SBR*2 (parts) | Hardness (JIS-A)*3 | 300% modulus (kgf/cm²)*3 |
|---|---|---|---|---|---|---|---|
| Example | | | | | | | |
| 1 | A | 50 | 50 | — | — | 71 | 185 |
| 2 | B | " | " | — | — | 72 | 180 |

TABLE 5-continued

| | | | | | | | |
|---|---|---|---|---|---|---|---|
| 3 | C | " | " | — | — | 73 | 175 |
| 4 | D | " | " | — | — | 71 | 180 |
| 5 | E | " | " | — | — | 72 | 180 |
| 6 | A | " | " | — | — | 70 | 155 |
| 7 | A | " | " | — | — | 69 | 160 |
| Comparative Example | | | | | | | |
| 1 | A | 15 | 85 | | | 67 | 150 |
| 2 | G | 50 | 30 | 20 | — | 70 | 170 |
| 3 | H | " | — | 20 | 30 | 69 | 165 |
| 4 | K | " | — | — | — | 72 | 165 |
| 5 | L | " | — | — | — | 70 | 165 |
| 6 | M | " | — | — | — | 71 | 155 |
| 7 | N | " | — | — | — | 70 | 170 |
| 8 | I/J | " | — | — | — | 70 | 165 |
| 9 | — | — | 50 | — | 50 | 68 | 150 |
| 10 | F | 50 | — | — | — | 71 | 170 |
| 11 | O | " | — | — | — | 69 | 180 |
| 12 | P | " | — | — | — | 70 | 180 |
| 13 | Q | " | — | — | — | 68 | 150 |

| | Tensile strength*3 (kgf/cm²) | | Elongation*3 (%) | 70° C. Dunlop rebound resilience (%) | Wet skid*4 (index) | Lambourn abrasion*5 (index) |
|---|---|---|---|---|---|---|
| | Room temperature | 100° C. | | | | |
| Example | | | | | | |
| 1 | 300 | 195 | 500 | 74 | 120 | 115 |
| 2 | 295 | 190 | 490 | 73 | 125 | 120 |
| 3 | 290 | 185 | 480 | 72 | 110 | 110 |
| 4 | 295 | 192 | 485 | 73 | 120 | 120 |
| 5 | 288 | 185 | 480 | 73 | 120 | 115 |
| 6 | 275 | 165 | 450 | 73 | 125 | 125 |
| 7 | 260 | 160 | 410 | 70 | 120 | 110 |
| Comparative Example | | | | | | |
| 1 | 330 | 240 | 520 | 72 | 70 | 70 |
| 2 | 260 | 160 | 430 | 65 | 140 | 85 |
| 3 | 275 | 165 | 500 | 70 | 95 | 110 |
| 4 | 235 | 140 | 420 | 72 | 135 | 80 |
| 5 | 280 | 170 | 490 | 70 | 80 | 110 |
| 6 | 250 | 160 | 480 | 69 | 115 | 95 |
| 7 | 285 | 180 | 490 | 70 | 100 | 100 |
| 8 | 255 | 155 | 440 | 69 | 110 | 90 |
| 9 | 295 | 160 | 510 | 70 | 80 | 120 |
| 10 | 290 | 175 | 470 | 71 | 120 | 115 |
| 11 | 295 | 195 | 500 | 73 | 120 | 115 |
| 12 | 295 | 190 | 485 | 73 | 125 | 120 |
| 13 | 255 | 160 | 430 | 65 | 100 | 190 |

Note:
*1BR01 (cis-1,4-butadiene 95%) manufactured by Japan Synthetic Rubber, Co., Ltd.
*2SBR# 1500 manufactured by Japan Synthetic Rubber, Co., Ltd.
*3JIS K-6301
*4Measured on a wet asphalt road by using a skid tester manufactured by English Stanley Co., Ltd., and indicated by index while Comparative Example 7 was taken as 100. The larger the figure, the better the wet skid resistance.
*5Indicated by index while Comparative Example 7 was taken as 100. The larger the figure, the better the friction resistance.

As discussed in the above, the rubber composition according to the present invention is excellent in wet skid property and rolling friction resistance, and further it is also excellent in wearing property fracture property, and particularly fracture strength at high temperatures than the conventional ones. Thus, the rubber composition according to the present invention may be suitably used as materials used in the tire tread portion, side wall portion, and carcass and materials for various kinds of industrial materials such as belt, hose, etc.

What is claimed is:

1. A vulcanized rubber composition containing not less than 20% by weight, based on the rubber component, of a block copolymer composed of polymer or copolymer block units (A) and random copolymer block units (B), said polymer or copolymer block units (A) being obtained by singly polymerizing a conjugated diolefine or copolymerizing the conjugated diolefine and a monovinyl aromatic hydrocarbon using a lithium initiator and containing not more than 10% by weight of bound monovinyl aromatic hydrocarbon and said random copolymer block (B) being obtained by copolymerizing the conjugated diolefine and the monovinyl aromatic hydrocarbon and containing 15 to 80% by weight of bound monovinyl aromatic hydrocarbon, wherein:

(i) the block copolymer contains not less than 10% by weight of each of the block units (A) and the block units (B);

(ii) the total content of the bound monovinyl aromatic hydrocarbon is from 10 to 40% by weight;

(iii) the average content of the vinyl bonds in the conjugated diolefine portions is from 20 to 70% and (iv) the polymerizable terminals of the block copolymer are reacted with an isocyanate compound, wherein the isocyanate compound is employed in an amount of 0.2 to 10 equivalents in terms of isocyanate groups per one mole of lithium atom of said lithium initiator.

2. A vulcanized rubber composition according to claim 1, wherein the average content of the vinyl bonds in the conjugated diolefine portions of the polymer or copolymer block units (A) is from 10 to 60%, the average content of the vinyl bonds of the conjugated diolefine portions of the copolymer block units (B) is from 25 to 90%, and the average content of the vinyl bonds of the copolymer block units (B) is larger by not less than 5% than that of the polymer or copolymer block units (A).

3. A vulcanized rubber composition as claimed in claim 1, wherein the isocyanate compound is employed in an amount of 0.5 to 4 equivalents in terms of isocyanate groups per one mole of lithium atom of said lithium initiator.

* * * * *